(12) United States Patent
Kim

(10) Patent No.: US 9,828,494 B2
(45) Date of Patent: Nov. 28, 2017

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventor: Byung Lip Kim, Yuseong-Gu (KR)

(73) Assignee: HANKOOK TIRE CO., LTD., Seoul (KR)

( * ) Notice: Subject to any disclaimer, the term of this patent is extended or adjusted under 35 U.S.C. 154(b) by 0 days.

(21) Appl. No.: 14/750,907

(22) Filed: Jun. 25, 2015

(65) Prior Publication Data

US 2015/0376381 A1    Dec. 31, 2015

(30) Foreign Application Priority Data

Jun. 30, 2014   (KR) .................. 10-2014-0080743

(51) Int. Cl.
| | | |
|---|---|---|
| C08L 9/08 | (2006.01) | |
| C08K 3/04 | (2006.01) | |
| B60C 1/00 | (2006.01) | |
| C08L 9/00 | (2006.01) | |
| C08J 3/205 | (2006.01) | |
| C08J 3/22 | (2006.01) | |

(52) U.S. Cl.
CPC .............. *C08L 9/08* (2013.01); *B60C 1/0016* (2013.01); *C08J 3/205* (2013.01); *C08J 3/226* (2013.01); *C08L 9/00* (2013.01); *C08J 2309/06* (2013.01); *C08J 2409/06* (2013.01); *C08L 2205/025* (2013.01); *C08L 2205/03* (2013.01); *C08L 2207/324* (2013.01); *C08L 2310/00* (2013.01)

(58) Field of Classification Search
CPC ......... C08L 9/08; C08L 2205/03; C08K 3/04; C08J 3/226
USPC .................................................. 524/496, 526
See application file for complete search history.

(56) References Cited

U.S. PATENT DOCUMENTS

| | | | | |
|---|---|---|---|---|
| 4,398,582 A | * | 8/1983 | Yuto ................. | B60C 1/0016 |
| | | | | 106/472 |
| 2006/0009564 A1 | * | 1/2006 | Simonot ............. | B60C 1/00 |
| | | | | 524/442 |
| 2010/0093960 A1 | * | 4/2010 | Zuppo, III ......... | B60C 1/0016 |
| | | | | 526/178 |

FOREIGN PATENT DOCUMENTS

| | | | |
|---|---|---|---|
| EP | 1493596 | * | 1/2005 |
| EP | 2610298 | A1 | 7/2013 |
| FR | 2955588 | A1 | 7/2011 |
| JP | 2004-238547 | A | 8/2004 |
| JP | 2008-156419 | A | 7/2008 |
| JP | 2009503167 | A | 1/2009 |
| JP | 2012-102239 | A | 5/2012 |
| JP | 2012-102240 | * | 5/2012 |
| JP | 2012102240 | A | 5/2012 |
| KR | 10-0709978 | B1 | 4/2007 |
| KR | 2014-0030706 | A | 3/2014 |

OTHER PUBLICATIONS

Office Action issued in Korean Pat. Appl. No. 10-2014-0080745 dated Sep. 15, 2015.
Extended European Search Report issued in European Appl. No. EP15174380.4 dated Nov. 18, 2015.
Office Action issued in Korean Patent Application No. 10-2014-0080743 dated Aug. 10, 2015.

* cited by examiner

*Primary Examiner* — Deve E Valdez
(74) *Attorney, Agent, or Firm* — Marshall, Gerstein & Borun LLP

(57) ABSTRACT

Disclosed is a rubber composition for tire treads and a tire manufactured using the same. More particular, the rubber composition for tire treads includes 50 to 200 parts by weight of a wet masterbatch prepared by reacting a styrene-butadiene latex, a carbon black and a liquid styrene-butadiene copolymer at 50 to 95° C. for three to nine hours according to a batchwise method, 60 to 70 parts by weight of a raw rubber, and 50 to 200 parts by weight of a carbon black. Accordingly, the rubber composition for tire treads has enhanced grip and anti-wear performances under a condition of heavy load, high slip and high speed, and thus, may be usefully used in manufacturing a ultra-high performance tire.

9 Claims, No Drawings

RUBBER COMPOSITION FOR TIRE TREAD AND TIRE MANUFACTURED BY USING THE SAME

TECHNICAL FIELD

The present disclosure relates to a rubber composition for tire treads and a tire manufactured using the same. More particularly, a rubber composition for tire treads that may be applied to an ultra-high tire by exhibiting grip and anti-wear performances under a condition of heavy load, high slip and high speed, and a tire manufactured using the same.

BACKGROUND

Recently, according to development of high-end vehicles exhibiting high performances (conditions such as heavy load, high slip and high speed), and development of the tuning industry in order to satisfy high performances, high performance required performance in a tire is also required. When such requirements are not satisfied, entry into a high-end vehicle market is impossible, which is directly related to sales of companies. In particular, since supply of high-end vehicles is directly related to tire performance, the market is one of important markets which should be entered.

In general, ultra-high performance tires require enhanced high grip force and anti-wear properties under a condition of heavy load, high slip and high speed. In particular, when a reinforcing filler is included in a large amount in order to meet high vehicle performances of high-end vehicles, durability is enhanced but grip performance is decreased, thereby dramatically decreasing overall performances of a tire. In addition, in order to increase Tg, a new polymer should be obtained, but, in the case of a special grade, it is not easy to obtain a new polymer. In addition, even though Tg is increased, lots of debris as in F1 Pirelli tire is remained on roads and wearing is rapidly progressed.

SUMMARY

Therefore, the present disclosure has been made in view of the above problems, and it is an object of the presently described embodiments to provide a rubber composition for tire treads that may be usefully applied to an ultra-high performance tire due to enhanced grip and anti-wear performances under a condition of heavy load, high slip and high speed.

It is another object of the presently described embodiments to provide a tire manufactured using the rubber composition for tire treads.

In accordance with an aspect of the presently described embodiments, the above and other objects can be accomplished by the provision of a rubber composition for tire treads, the rubber composition including 50 to 200 parts by weight of a wet masterbatch prepared by mixing a styrene-butadiene latex, a carbon black and a liquid styrene-butadiene copolymer at 50 to 95° C. for three to nine hours according to a batchwise method, 60 to 70 parts by weight of a raw rubber and 50 to 200 parts by weight of a carbon black.

The wet masterbatch may be prepared by mixing 60 to 150 parts by weight of the carbon black and 60 to 200 parts by weight of the liquid styrene-butadiene copolymer with respect to 100 parts by weight of the styrene-butadiene latex.

A terminal hydrogen of the liquid styrene-butadiene copolymer may be substituted with any one selected from the group consisting of a C1 to C10 alkyl group, a C3 to C30 cycloalkyl group, a C2 to C30 heterocycloalkyl, a C3 to C30 aryl group and a C2 to C30 heteroaryl group.

In the liquid styrene-butadiene copolymer, the amount of styrene may be 17 to 27 wt %, and the amount of vinyl in butadiene may be 60 to 80 wt %.

In the styrene-butadiene latex, the amount of styrene may be 40 to 60 wt %, and the amount of vinyl in butadiene may be 15 to 45 wt %.

The carbon black may have an iodine absorption amount of 200 to 1000 mg/g and an N-dibutyl phthalate (DBP) oil absorption amount of 150 to 800 cc/100 g.

The wet masterbatch may be prepared by further adding a processing oil in an amount of 10 to 100 parts by weight. The processing oil may include 35±5 wt % of an aromatic ingredient, 28±5 wt % of a naphthenic ingredient and 38±5 wt % of a paraffin based ingredient with respect to the total amount of the processing oil.

In the processing oil, the content of benzo(a)pyrene (BaP) as an ingredient among polycyclic aromatic hydrocarbon (PAH) may be 1 ppm or less, and a total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA) and dibenzo(a,h)anthracene may be 10 ppm or less.

The raw rubber may be a styrene-butadiene rubber in which the content of styrene is 30 to 50 wt %, the content of vinyl in butadiene is 40 to 65 wt %, the content of oil is 5 to 45 wt %, and glass transition temperature is −19° C. to −29° C.

In accordance with another aspect of the present disclosure, there is provided a tire manufactured using the rubber composition for tire treads.

DETAILED DESCRIPTION

Hereinafter, the presently described embodiments are described in more detail.

A rubber composition for tire treads according to an embodiment of the present disclosure includes 1) 50 to 200 parts by weight of a wet masterbatch that is prepared by mixing styrene-butadiene latex, carbon black and a liquid styrene-butadiene copolymer, 2) 60 to 70 parts by weight of a raw rubber, and 3) 50 to 200 parts by weight of a carbon black.

Hereinafter, each ingredient is described in detail.

1) Wet Masterbatch

The wet masterbatch may be prepared by reacting i) the styrene-butadiene latex, ii) the carbon black and iii) the liquid styrene-butadiene copolymer at 50 to 95° C. for three to nine hours time according to a batchwise method.

More particularly, the wet masterbatch is reacted for three to nine hours at 50 to 95° C. after inputting water into a batchwise reactor and inputting i) the styrene-butadiene latex, ii) the carbon black, and iii) the liquid styrene-butadiene copolymer into the reactor, according to a batchwise method. After the reaction, moisture is evaporated while stirring a reaction product, and the reaction product may be extruded into a sheet type by passing through a roll.

In addition, when reaction temperature is less than 50° C. upon preparation of the wet masterbatch, synthesis reaction between raw materials might not occur. When reaction temperature is greater than 95° C., water in the reactor is evaporated, and thus, dispersibility may be decreased. In addition, upon preparation of the wet masterbatch, synthesis reaction between raw materials might not occur when a reaction time is less than three hours, and, since additional reaction does not proceed when a reaction time exceeds nine hours, it is unnecessary to exceed nine hours.

The wet masterbatch may be prepared by mixing i) 100 parts by weight of the styrene-butadiene latex, ii) 60 to 150 parts by weight of the carbon black, and iii) 60 to 200 parts by weight of the liquid styrene-butadiene copolymer. When the content of carbon black is less than 60 parts by weight, improvement effects according to use of the carbon black are insignificant. When the content of carbon black exceeds 150 parts by weight, dispersion time is reduced due to heating, and thus, dispersibility may be decreased. In addition, when the content of liquid styrene-butadiene copolymer is less than 60 parts by weight, improvement effects according to use of the liquid styrene-butadiene copolymer is insignificant during reaction. When the content of liquid styrene-butadiene copolymer exceeds 200 parts by weight, processability may be deteriorated.

In i) the styrene-butadiene latex used in preparation of the wet masterbatch, the content of styrene may be 40 to 60 wt %, and the content of vinyl in butadiene may be 15 to 45 wt %. The styrene-butadiene latex may enhance grip performance by increasing glass transition temperature (Tg) of a tread compound.

However, when mixing is performed using the styrene-butadiene latex in order to grip performance, processability and dispersibility may be very poor. In order to such a problem, the rubber composition for tire treads includes wet masterbatch prepared by mixing the styrene-butadiene latex with super fine carbon black particles having superior complementarity and plant based oil having superior dispersibility.

That is, even though the styrene-butadiene latex has a high styrene content, realization of high viscosity and handling are difficult, and thus, there are disadvantages in various aspects such as processability and handling, dispersibility during mixing. Accordingly, in order to enhance advantages of the styrene-butadiene latex and overcome disadvantages, handling and dispersibility may be enhanced during mixing, by substituting a processing oil used in conventional wet masterbatch with the liquid styrene-butadiene copolymer. In addition, a rubber composition for tire treads having high glass transition temperature (Tg) and fast grip performance during high-speed driving may be prepared by applying the wet masterbatch to the rubber composition for tire treads.

ii) The carbon black may preferably be an ultra-high-density carbon black having an iodine absorption amount of 200 to 1000 mg/g and an N-dibutyl phthalate (DBP) oil absorption amount of 150 to 800 cc/100 g. When the ultra-high-density carbon black is used, hysteresis due to high heat generation during driving may be enhanced.

iii) The liquid styrene-butadiene copolymer may include 17 to 27 wt % of styrene and 60 to 80 wt % of vinyl in butadiene. When the liquid styrene-butadiene copolymer including the styrene the content and the vinyl in butadiene in the contents is applied, a compound that may secure optimal grip performance and durability performance may be prepared.

In addition, iii) a terminal hydrogen of the liquid styrene-butadiene copolymer may be substituted with any one selected from the group consisting of a C1 to C10 alkyl group, a C3 to C30 cycloalkyl group, a C2 to C30 heterocycloalkyl group, a C3 to C30 aryl group and a C2 to C30 heteroaryl group, preferably a methyl group, an ethyl group, a cyclobutyl group, a cyclohexyl group, or a phenyl group.

When the terminal hydrogen of the liquid styrene-butadiene copolymer is substituted with the substituent, binding capacity within rubber of the liquid styrene-butadiene copolymer increases, and thus, anti-wear performance may be improved.

When iiii) a terminal of the liquid styrene-butadiene copolymer is substituted with the substituent, affinity to the styrene-butadiene latex and the carbon black is enhanced, and dispersibility of the liquid styrene-butadiene copolymer may be dramatically increased.

As described above, the wet masterbatch may use the liquid styrene-butadiene copolymer instead of a processing oil used in a wet masterbatch, or may include a small amount of iv) a processing oil. That is, the wet masterbatch may be prepared by further adding 10 to 100 parts by weight of the processing oil, preferably 10 to 45 parts by weight of the processing oil. In this case, dispersibility of the styrene-butadiene latex, the carbon black and the liquid styrene-butadiene copolymer may be further enhanced. As the processing oil, an eco-friendly residual aromatic extract (RAE) oil, in which the content of benzo(a)pyrene (BaP) as an ingredient among polycyclic aromatic hydrocarbon (PAH) is 1 ppm or less, and the total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA), dibenzo(a,h)anthracene is 10 ppm or less, may be preferably used.

2) Raw Material Rubber

Meanwhile, in the rubber composition for tire treads, Examples of 2) the raw rubber include polyisoprene rubber, polybutadiene rubber, conjugated diene aromatic vinyl copolymers, nitrile conjugated diene copolymers, hydrogenated NBR, hydrogenated NBR, olefin rubber, ethylene-propylene rubber modified with maleic acid, butyl rubber, a copolymer of isobutylene and aromatic vinyl or a diene monomer, acrylic rubber, ionomers, halogenated rubber, chloroprene rubber, or mixtures of one material type or two or more material types thereof. When improvement effects according to use of the raw rubber are considered, the raw rubber may preferably include styrene-butadiene rubber.

In addition, the styrene-butadiene rubber is rubber solution-polymerized according to a batchwise method. Preferably, the content of styrene is 30 to 50 wt %, the content of vinyl in butadiene is 40 to 65 wt %, the content of oil is 5 to 45 wt %, and Tg is −19 to −29° C. In addition, together with the conditions, the weight-average molecular weight of the styrene-butadiene rubber may preferably be 400,000 to 1000,000 g/mol, and a molecular weight distribution thereof may preferably be 1.1 or less.

In this case, the oil may preferably include, particularly, 35±5 wt % of an aromatic ingredient, 28±5 wt % of a naphthenic ingredient, 38±5 wt % of a paraffin based ingredient with respect to the total weight of the processing oil. In addition, as the processing oil, an eco-friendly residual aromatic extraction oil (RAE oil), in which the content of benzo(a)pyrene (BaP) as an ingredient among polycyclic aromatic hydrocarbon (PAH) is 1 ppm or less, and the total content of eight PAH types such as benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA), dibenzo(a,h)anthracene is 10 ppm or less, may be more preferable.

When the solution-polymerized styrene-butadiene rubber satisfying constituents and properties such as the weight-average molecular weight and the molecular weight distribution described above is used, grip performance under a condition of heavy load, high slip, and high speed may be further enhanced.

3) Carbon Black

In the rubber composition for tire treads, carbon black that may be used as a reinforcing agent may be the same as carbon black that was previously used in 1) the wet masterbatch. In particular, ultra-high-density carbon black having an iodine absorption amount of 200 to 1000 mg/g and an N-dibutyl phthalate (DBP) oil absorption amount of 150 to 800 ml/100 g may be preferable.

The rubber composition for tire treads may include 50 to 200 parts by weight of the wet masterbatch, 60 to 70 parts by weight of the raw rubber, and 50 to 200 parts by weight of a carbon black. When the content of the wet masterbatch is less than 50 parts by weight, improvement effects according to used of the wet masterbatch are insignificant. When the content of the wet masterbatch exceeds 200 parts by weight, dispersion time due to heating during reaction should be decreased. Accordingly, dispersity may be decreased. In addition, when the content of the raw rubber is less than 60 parts by weight, grip performance may be deteriorated under a condition of heavy load, high slip and high speed. When the content of the raw rubber exceeds 70 parts by weight, durability may be deteriorated. When the content of the carbon black is less than 50 parts by weight, improvement effects in durability and grip performance may be insignificant. When the content of the carbon black exceeds 200 parts by weight, much time is consumed until grip performance is exhibited, and processability may be deteriorated due to high heating.

4) Other Additives

The rubber composition for tire treads may selectively, further include a variety of additives such as a vulcanizing agent, a vulcanization accelerator, a vulcanization acceleration aid, an aging preventing agent or an adhesive. The additives may be any one that is generally used in the art. The contents of additives are determined according to mixing ratios used in general rubber compositions for tire tread, and are not specifically limited.

As the vulcanizing agent, a sulfur-based vulcanizing agent is preferably used. The sulfur-based vulcanizing agent may use an inorganic vulcanizing agent such as sulfur powder (S), insoluble sulfur (S), precipitated sulfur (S), or colloidal sulfur. In particular, as the sulfur-based vulcanizing agent, elemental sulfur, or a vulcanizing agent that produce sulfur, e.g., an amine disulfide or polymeric sulfur, may be used.

The vulcanizing agent is preferably included in an amount of 0.5 parts to 2 parts by weight with respect to 100 parts by weight of the raw rubber. In this case, the vulcanizing agent exhibits appropriate vulcanizing effects and the raw rubber is less sensitive to heat and is chemically stable.

The vulcanization accelerator means an accelerator that accelerates the rate of vulcanization or facilities the retarding action in an initial vulcanization stage.

The vulcanization accelerator may be any one selected form the group consisting of sulfenamide based compounds, thiazole based compounds, thiuram based compounds, thiourea based compounds, guanidine based compounds, dithiocarbamic acid based compounds, aldehyde amine based compounds, aldehyde ammonia based compounds, imidazoline-based compounds, xanthate based compounds and combinations thereof.

As the sulfenamide based vulcanization accelerators, any one sulfenamide based compound selected from the group consisting of, for example, N-cyclohexyl-2-benzothiazole sulfenamide(CBS), N-tert-butyl-2-benzothiazole sulfenamide(TBBS), N,N-dicyclohexyl-2-benzothiazole sulfenamide, N-oxydiethylene-2-benzothiazole sulfenamide, N,N-diisopropyl-2-benzothiazole sulfenamide and combinations thereof may be used.

As the thiazole based vulcanization accelerator, any one thiazole based compound selected from the group consisting of, for example, 2-mercaptobenzothiazole (MBT), dibenzothiazole disulfide (MBTS), sodium salts of 2-mercaptobenzothiazole, zinc salts of 2-mercaptobenzothiazole, copper salts of 2-mercaptobenzothiazole, cyclohexylamine salts of 2-mercaptobenzothiazole, 2-(2,4-dinitrophenyl)mercaptobenzothiazole, 2-(2,6-diethyl-4-morpholino thio)benzothiazole and combinations thereof may be used.

As the thiuram based vulcanization accelerator, for example, any one thiuram based compound selected from the group consisting of tetramethylthiuram disulfide (TMTD), tetraethylthiuram disulfide, tetramethylthiuram mono sulfide, dipentamethylenethiuram disulfide, dipentamethylenethiuram monosulfide, dipentamethylenethiuram tetrasulfide, dipentamethyelnethiuram hexasulfide, tetrabutylthiuram disulfide, pentamethylenethiuram tetrasulfide and combinations thereof may be used.

As the thiourea based vulcanization accelerator, any one thiourea based compound selected from the group consisting of, for example, thiocarbamide, diethylthiourea, dibutylthiourea, trimethylthiourea, di-ortho-tolylthiourea and combinations thereof may be used.

As the guanidine based vulcanization accelerator, any one guanidine based compound selected from the group consisting of, for example, diphenylguanidine, di-ortho-tolylguanidine, triphenylguanidine, ortho-tolylbiguanide, diphenylguanidine phthalate and combinations thereof may be used.

As the dithiocarbamic acid based vulcanization accelerator, any one dithiocarbamic acid based compound selected from the group consisting of, for example, zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salts of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate and combinations thereof may used.

As the aldehyde amine based or aldehyde ammonia based vulcanization accelerator, an aldehyde amine based compound or an aldehyde ammonia based compound selected from the group consisting of, for example, acetaldehyde-aniline reaction products, butyraldehyde-aniline condensates, hexamethylenetetramine, acetaldehyde-ammonia reaction products and combinations thereof may be used.

As the imidazoline-based vulcanization accelerator, for example, an imidazoline-based compound such as 2-mercaptoimidazoline may be used, and as the xanthate based vulcanization accelerator, for example, a xanthate based compound such as zinc dibutyl xanthogenate may be used.

In order to maximize the increase of productivity through the acceleration of the rate of vulcanization, and to maximize improvement of rubber properties, the vulcanization accelerator may be included in an amount of 1.5 to 3.5 parts by weight with respect to 100 parts by weight of the raw rubber.

The vulcanization acceleration aid is a mixing agent used in combination with the vulcanization accelerator in order to perfect the accelerating effect, and may be any one selected from the group consisting of inorganic vulcanization acceleration aids, organic vulcanization acceleration aids, and combinations thereof.

As the inorganic vulcanization acceleration aid, any one selected from the group consisting of zinc oxide (ZnO), zinc carbonate, magnesium oxide (MgO), lead oxide, potassium hydroxide and combinations thereof may be used. As the organic vulcanization acceleration aid, any one selected from the group consisting of stearic acid, zinc stearate, palmitic acid, linoleic acid, oleic acid, lauric acid, dibutyl ammonium oleate, derivatives thereof and combinations thereof may be used.

In particular, zinc oxide and stearic acid may be used together as the vulcanization acceleration aid. In this case, zinc oxide is dissolved in stearic acid and forms an effective complex with the vulcanization accelerator, and thus, the complex produces free sulfur during the vulcanization reaction, thereby facilitating the crosslinking reaction of rubber.

When zinc oxide and stearic acid are used together, zinc oxide and stearic acid may be respectively used in amounts of 1 to 5 parts by weight and 0.5 to 3 parts by weight, in order to function as an adequate vulcanization acceleration aid. When the amounts of the zinc oxide and the stearic acid are below the range, vulcanization rate decreases and thus productivity may be deteriorated. When the amounts of the zinc oxide and the stearic acid exceed the range, scorching occurs and thus properties may be deteriorated.

The aging preventing agent is an additive used to stop the chain reactions in which the tire is auto-oxidized by oxygen. As the aging preventing agent, any one selected from the group consisting of amines, phenols, quinolines, imidazoles, carbamic acid metal salts, waxes and combinations thereof may be appropriately selected and used As the amine based aging preventing agent, any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine and combinations thereof may be used. As the phenol based aging preventing agent, any one selected from the group consisting of 2,2'-methylenebis(4-methyl-6-tert-butylphenol), 2,2'-isobutylidenebis(4,6-dimethylphenol),2,6-di-t-butyl-p-cresol and combinations thereof may be used. As the quinoline based aging preventing agent, 2,2,4-trimethyl-1,2-dihydroquinoline and derivatives thereof may be used, particularly, any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof may be used. As the wax, waxy hydrocarbons may be preferably used.

The aging preventing agent, when, in addition to the aging preventing action, conditions such as high solubility in rubber and low volatility, nonreactivity with rubber, and non-inhibition of vulcanization are considered, the aging preventing agent may be included in an amount of 1 parts to 6 parts by weight with respect to 100 parts by weight of the raw rubber.

The adhesive contributes to enhancement of the properties of rubber by further enhancing adhesion between rubber and rubber, and improving compatibility, dispersibility and processability of other additives such as a filler.

As the adhesive, natural resin based adhesives such as rosin based resins and terpene based resins, and synthetic resin based adhesives such as petroleum resins, coal tar, and alkylphenol based resins may be used.

As the rosin-based resins, any one selected from the group consisting of rosin resin, a rosin ester resin, a hydrogenated rosin ester resin, derivatives thereof, and combinations thereof may be used. As the terpene based resins, any one selected from the group consisting of a terpene resin, a terpene phenol resin, and combinations thereof may be used.

As the petroleum resins, any one selected from the group consisting of aliphatic resins, acid-modified aliphatic resins, alicyclic resins, hydrogenated alicyclic resins, aromatic (C9) resins, hydrogenated aromatic resins, C5-C9 copolymer resins, styrene resins, styrene copolymer resins, and combinations thereof may be used.

The coal tar may be a coumarone-indene resin.

As the alkylphenol resins, p-tert-alkylphenol formaldehyde resins may be used, and the p-tert-alkylphenol formaldehyde resin may be any one selected from the group consisting of p-tert-butylphenol formaldehyde resin, p-tert-octylphenol formaldehyde, and combinations thereof.

The adhesive may be included in an amount of 2 to 4 parts by weight with respect to 100 parts by weight of the raw rubber. When the content of the adhesive is less than 2 parts by weight with respect to 100 parts by weight of the raw rubber, adhesion performance may be deteriorated, and when the content of the adhesive exceeds 4 parts by weight, rubber properties may be deteriorated.

The rubber composition for tire treads may be prepared through a general two-step process. That is, the rubber composition may be prepared in an appropriate mixer, using a first step of thermomechanically treating or kneading at high temperature of 110° C. to 190° C., preferably at high temperature of 130° C. to 180° C. and a second step of mechanically treating typically at low temperature of less than 110° C., e.g., 40° C. to 100° C. during a finishing step in which a cross-linking system is mixed, but the present disclosure is not limited thereto.

The rubber composition for tire treads may be included not only in the tread (tread cap and tread base), but also in various rubber constituent elements that constitute the tire. Examples of the rubber constituents include side walls, side wall inserts, apexes, chafers, wire coats, inner liners, etc.

A tire according to another embodiment is manufactured using the rubber composition for tire treads. A method of manufacturing a tire using the rubber composition for tire treads may be any one of conventional manufacturing methods, and detailed description therefore is omitted.

Examples of the tire include light truck radial (LTR) tires, ultra high performance (UHP) tires, tires for race cars, off-road tires, tires for airplanes, tires for agricultural machines, truck tires or bus tires. In addition, the tire may be a radial tire or a bias tire, and the radial tire is preferable.

A rubber composition for tire treads according to the present embodiments has enhanced grip and anti-wear performances under a condition of heavy load, high slip and high speed, and thus, may be usefully applied to an ultra-high performance tire.

Hereinafter, the presently described embodiments will be described in detail by way of examples so that those having ordinary skill in the art can easily carry out the described embodiments. However, the presently described embodiments can be realized in various different forms, and is not intended to be limited to the examples described herein.

Examples 1 to 6, and Comparative Example 1

Preparation of Rubber Composition

Rubber compositions for tire tread according to Examples and Comparative Examples were prepared using compositions summarized in Table 1 below. The rubber compositions were prepared according to a general rubber composition method.

TABLE 1

|  | | Comparative Example 1 | Example 1 | Example 2 | Example 3 | Example 4 | Example 5 | Example 6 |
|---|---|---|---|---|---|---|---|---|
| Wet masterbatch[1] | | 190 | 190 | 190 | 190 | 190 | 190 | 190 |
| Composition of wet masterbatch | Styrene-butadiene latex | 100 | 100 | 100 | 100 | 100 | 100 | 100 |
| | Carbon black[3] | 140 | 140 | 140 | 140 | 140 | 140 | 140 |
| | Liquid SBR copolymer | — | 140 | 40 | 70 | 100 | 160 | 200 |
| | RAE oil | 140 | — | 100 | 70 | 40 | — | — |
| Raw material rubber[2] | | 60 | 60 | 60 | 60 | 60 | 60 | 60 |
| Carbon black[3] | | 100 | 100 | 100 | 100 | 100 | 100 | 100 |
| Petroleum based resin[4] | | 20 | — | — | — | — | — | — |
| Aging preventing agent | | 6 | 6 | 6 | 6 | 6 | 6 | 6 |
| Vulcanizing agent | | 0.8 | 0.8 | 0.8 | 0.8 | 0.8 | 0.8 | 0.8 |
| Vulcanization accelerator | | 3 | 3 | 3 | 3 | 3 | 3 | 3 |

Unit: parts by weight
[1] Wet masterbatch: 40 to 60 wt % of styrene, a styrene-butadiene latex including 15 to 45 wt % of vinyl in butadiene, carbon black having an iodine absorption amount of 200 to 1000 mg/g and a DBP oil absorption amount of 150 to 800 cc/100 g, and a liquid styrene-butadiene copolymer having Tg of −15° C., 70 wt % of vinyl in butadiene, 17 to 27 wt % of styrene the content, a weight-average molecular weight of 4,500 g/mol, and/or RAE oil were mixed at 50° C. for six hours according to a batchwise method, thereby preparing a wet masterbatch.
[2] Raw material rubber: a styrene-butadiene rubber including 30 to 50 wt % of styrene, 40 to 65 wt % of vinyl in butadiene and 5 to 45 wt % of RAE oil and having Tg of −19 to −29° C. was polymerized according to a batchwise method.
[3] Carbon black: super-fine-particle-type carbon black having an iodine absorption amount of 200 to 1000 mg/g and a DBP oil absorption amount of 150 to 800 ml/100 g.
[4] Petroleum based resin: petroleum based resin having a softening point of 50 to 90° C.

1) Wet masterbatch: 40 to 60 wt % of styrene, a styrene-butadiene latex including 15 to 45 wt % of vinyl in butadiene, carbon black having an iodine absorption amount of 200 to 1000 mg/g and a DBP oil absorption amount of 150 to 800 cc/100 g, and a liquid styrene-butadiene copolymer having Tg of −15° C., 70 wt % of vinyl in butadiene, 17 to 27 wt % of styrene the content, a weight-average molecular weight of 4,500 g/mol, and/or RAE oil were mixed at 50° C. for six hours according to a batchwise method, thereby preparing a wet masterbatch.

2) Raw material rubber: a styrene-butadiene rubber including 30 to 50 wt % of styrene, 40 to 65 wt % of vinyl in butadiene and 5 to 45 wt % of RAE oil and having Tg of −19 to −29° C. was polymerized according to a batchwise method.

3) Carbon black: super-fine-particle-type carbon black having an iodine absorption amount of 200 to 1000 mg/g and a DBP oil absorption amount of 150 to 800 ml/100 g.

4) Petroleum based resin: petroleum based resin having a softening point of 50 to 90° C.

Experimental Example 1
Property Measurement of Prepared Rubber Compositions

Properties of rubber specimens prepared according to Examples and Comparative Example were measured. Results are summarized in Table 2 below.

Tg means a time point where a rubber phase charges. In the case of an ultra-high performance racing tire, high-speed driving and grip performance upon rapid braking are excellent with increasing Tg.

300% modulus was measured according to ISO 37 standard.

In regard to viscoelasticity, G', G" and tan δ were measured at −60° C. up to 80° C. in 0.5% strain under 10 Hz frequency using an RDS meter.

TABLE 2

| | Comparative Example 1 | Example 1 | Example 2 | Example 3 | Example 4 | Example 5 | Example 6 |
|---|---|---|---|---|---|---|---|
| WMB Tg | −39 | −23 | −32 | −28 | −25 | −22 | −19 |
| Comp'd Tg | −31 | −23 | −32 | −22 | −19 | −12 | −11 |
| 300% modulus | 62 | 60 | 59 | 58 | 56 | 55 | 53 |
| 60° C. tanδ | 0.221 | 0.239 | 0.246 | 0.255 | 0.267 | 0.271 | 0.280 |

In addition, treads were prepared using the rubber prepared according to Comparative Examples and Examples, and 240/640R18 F200 standard tires including the tread rubber as a semi-product were manufactured. The manufactured tires were subjected to measurement of anti-wear performance on a dry road, brake performance on a dry road, and a grip rate. Results are summarized in Table 3 below as relative ratios to the results of Comparative Example 1.

TABLE 3

|  | Comparative Example 1 | Example 1 | Example 2 | Example 3 | Example 4 | Example 5 | Example 6 |
|---|---|---|---|---|---|---|---|
| Anti-wear performance | 100 | 100 | 101 | 101 | 100 | 101 | 100 |
| Durability | 100 | 100 | 101 | 101 | 100 | 101 | 100 |
| Grip ratio | 100 | 140 | 126 | 129 | 132 | 137 | 135 |

Referring to Tables 2 and 3, it can be confirmed that, in Examples 1 to 6 where the liquid styrene-butadiene copolymer instead of oil was used in wet masterbatch, Tg values were increased, anti-wear performance and durability were maintained, and grip performance was increased by 40% or more, compared with a conventional case.

Although the preferred embodiments have been disclosed for illustrative purposes, those skilled in the art will appreciate that various modifications, additions and substitutions are possible, without departing from the scope and spirit of the disclosure as disclosed in the accompanying claims.

What is claimed is:

1. A rubber composition for tire treads, the rubber composition comprising:
   50 to 200 parts by weight of a wet masterbatch based on the total weight of the composition,
   60 to 70 parts by weight of a raw rubber based on the total weight of the composition, and
   50 to 200 parts by weight of a carbon black based on the total weight of the composition,
   wherein the wet masterbatch is prepared by mixing a styrene-butadiene latex, a carbon black and a liquid styrene-butadiene copolymer at 50 to 95° C. for three to nine hours according to a batchwise method, and
   wherein a terminal hydrogen of the liquid styrene-butadiene copolymer is substituted with any one selected from the group consisting of a C1 to C10 alkyl group, a C3 to C30 cycloalkyl group, a C2 to C30 heterocycloalkyl, a C3 to C30 aryl group and a C2 to C30 heteroaryl group.

2. The rubber composition according to claim 1, wherein the wet masterbatch is prepared by mixing 60 to 150 parts by weight of the carbon black with respect to 100 parts by weight of the styrene butadiene latex and 60 to 200 parts by weight of the liquid styrene-butadiene copolymer with respect to 100 parts by weight of the styrene-butadiene latex.

3. The rubber composition according to claim 1, wherein, in the liquid styrene-butadiene copolymer, an amount of styrene is 17 to 27 wt % based on the total weight of the copolymer, and an amount of vinyl in butadiene is 60 to 80 wt % based on the total weight of the copolymer.

4. The rubber composition according to claim 1, wherein, in the styrene-butadiene latex, an amount of styrene is 40 to 60 wt % based on the total weight of the latex, and an amount of vinyl in butadiene is 15 to 45 wt % based on the total weight of the latex.

5. The rubber composition according to claim 1, wherein the carbon black included in the wet masterbatch has an iodine absorption amount of 200 to 1000 mg/g and an N-dibutyl phthalate (DBP) oil absorption amount of 150 to 800 cc/100 g.

6. The rubber composition according to claim 1, wherein the wet masterbatch is prepared by further adding 10 to 100 parts by weight of a processing oil with respect to 100 parts by weight of the styrene-butadiene latex,
   wherein the processing oil comprises 30 to 40 wt % of an aromatic ingredient, 23 to 33 wt % of a naphthenic ingredient and 33 to 43 wt % of a paraffin based ingredient with respect to a total amount of the processing oil.

7. The rubber composition according to claim 6, wherein, in the processing oil, a content of benzo(a)pyrene (BaP) as an ingredient among polycyclic aromatic hydrocarbon (PAH) is 1 ppm or less, and
   a total content of one or more of eight polycyclic aromatic hydrocarbons comprising benzo(a)pyrene (BaP), benzo(e)pyren (BeP), benzo(a)anthracene (BaA), chrysen (CHR), benzo(b)fluoranthene (BbFA), benzo(j)fluoranthene (BjFA), benzo(k)fluoranthene (BkFA) and dibenzo(a,h)anthracene is 10 ppm or less.

8. The rubber composition according to claim 1, wherein the raw rubber comprises a styrene-butadiene rubber in which a content of styrene is 30 to 50 wt % based on the total weight of the rubber, a content of vinyl in butadiene is 40 to 65 wt % based on the total weight of the rubber, a content of oil is 5 to 45 wt % based on the total weight of the rubber, and glass transition temperature is -19° C. to -29° C.

9. A tire manufactured using the rubber composition for tire tread according to claim 1.

* * * * *